Patented Nov. 13, 1928.

1,691,452

UNITED STATES PATENT OFFICE.

EDSON R. WOLCOTT, OF LOS ANGELES, CALIFORNIA, ASSIGNOR, BY MESNE ASSIGNMENTS, TO THE TEXAS COMPANY, OF NEW YORK, N. Y., A CORPORATION OF DELAWARE.

MANUFACTURE OF HYDROCHLORIC ACID.

No Drawing.   Application filed October 1, 1924.   Serial No. 740,903.

My invention relates to the manufacture of hydrochloric acid; it comprises a process for the preparation of hydrochloric acid from sodium chlorid, clay and steam which provides for an intimate mixture of sodium chlorid with clay and with a carbonaceous binder, heating the mixture to form a porous coke and subjecting the heated coke to the action of steam.

Although the preparation of hydrochloric acid by means of the reaction obtaining between sodium chlorid, clay and steam is comparatively simple on a small scale, certain difficulties attend its manufacture in commercially important quantities. The sodium chlorid and clay are solid materials and their reaction with the gaseous reagent, steam, depends upon the amount of surface exposed to its action. It is possible to increase this surface by preparing the mixture of solid materials in a fine state of sub-division but any advantage thus gained is minimized by the packing action of the finely divided solids which tend to form an impervious mass through which it is difficult to pass steam. As a result of this difficulty in obtaining contact between the reacting substances, it is necessary to use a very high temperature to carry out the reaction which causes greatly increased wear on the retorts and other apparatus. Also, with such conditions opposing the course of the reaction, it is impossible to obtain satisfactory yields of hydrochloric acid.

I have found that by improving the contact between the reacting substances I can carry out the reaction at a lower temperature, with less wear on the retort and apparatus and obtain increased yields of hydrochloric acid. In order to effect this increased contact I intimately mix the salt and clay in the proportions required for the reaction together with a comparatively small portion of a binder which may be a carbonaceous material, such as asphalt or pitch or acid sludge or similar substances. This mixture is heated and coked in any appropriate apparatus, care being taken not to heat to such temperatures as to cause fusion of the sodium chlorid. The resulting material is in the form of a porous coke which may be broken up into pieces of a size convenient for handling and thereafter charged to any suitable type of retort or container where it is exposed to an elevated temperature and a current of steam to produce vapors of hydrochloric acid.

Obviously many modifications and variations of the invention, as hereinbefore set forth, may be made without departing from the spirit and scope thereof, and therefore, only such limitations should be imposed as are indicated in the appended claim.

What I claim is:

In the preparation of a porous coke adapted to the production of hydrochloric acid by contact with steam at elevated temperatures, the method which consists in intimately mixing sodium chlorid and clay with a carbonaceous binder and then effecting destructive distillation of the mixture at a temperature less than 1500° F. to form the said porous coke.

In witness whereof I have hereunto set my hand this 10th day of September, 1924.

EDSON R. WOLCOTT.